UNITED STATES PATENT OFFICE.

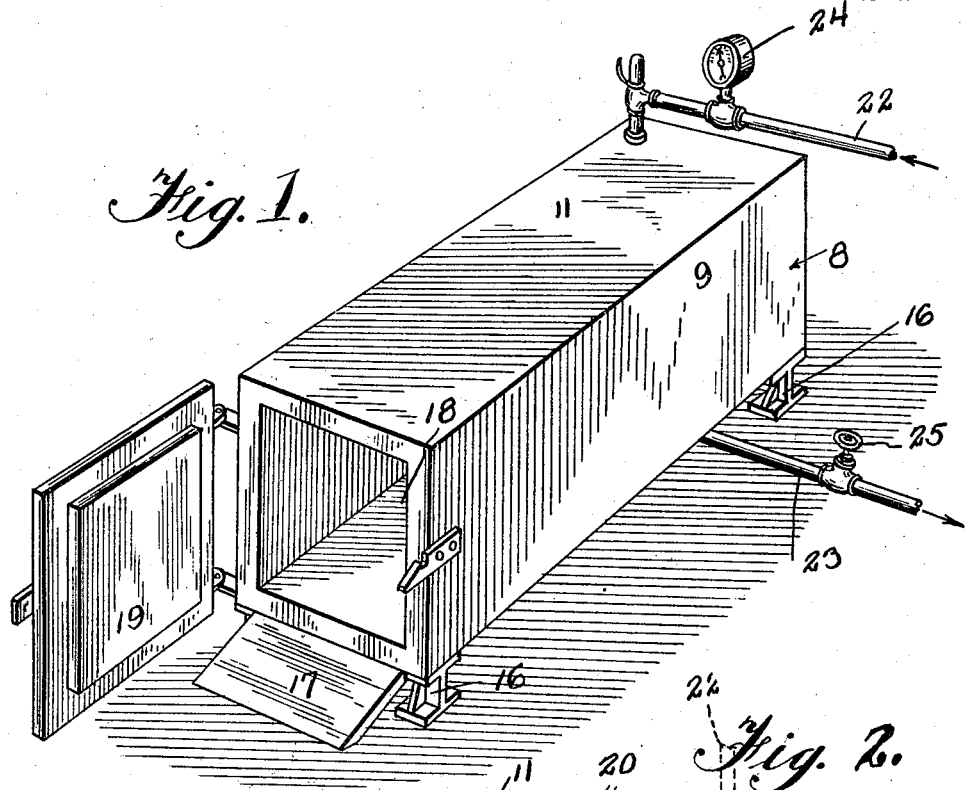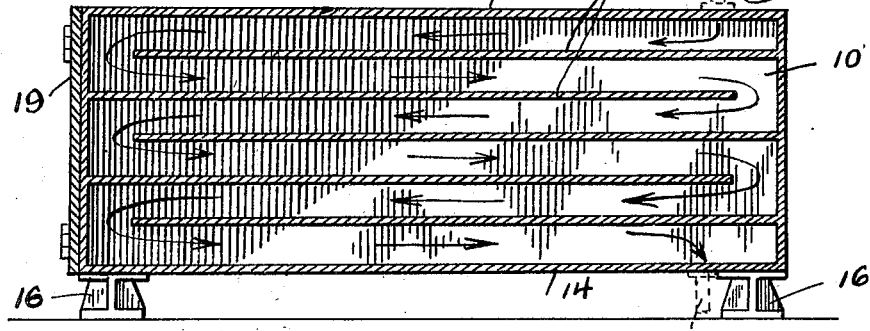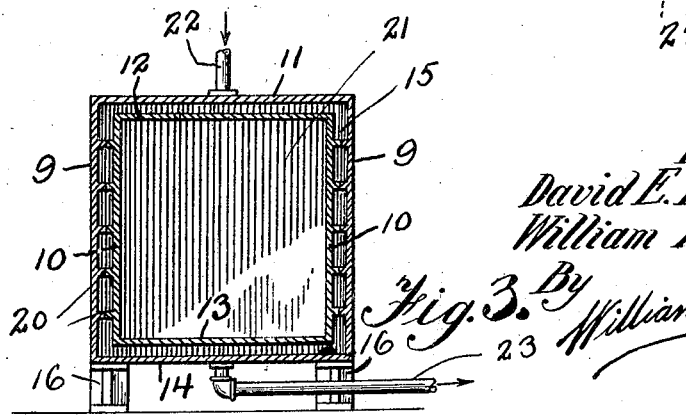

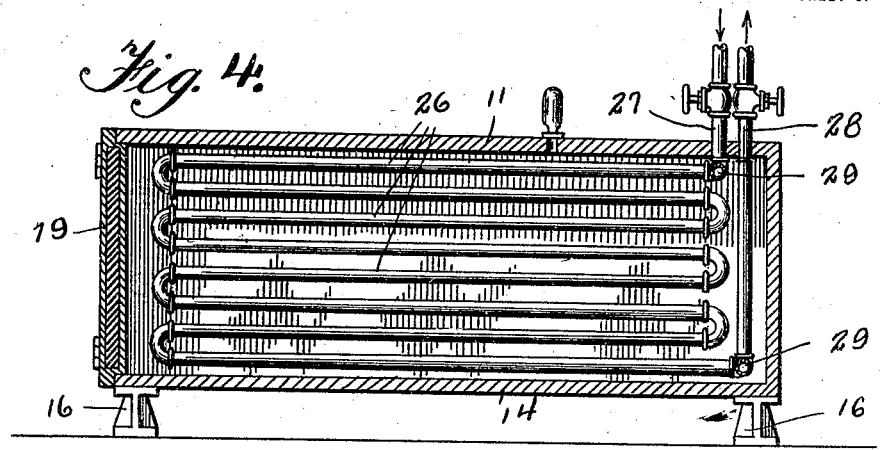
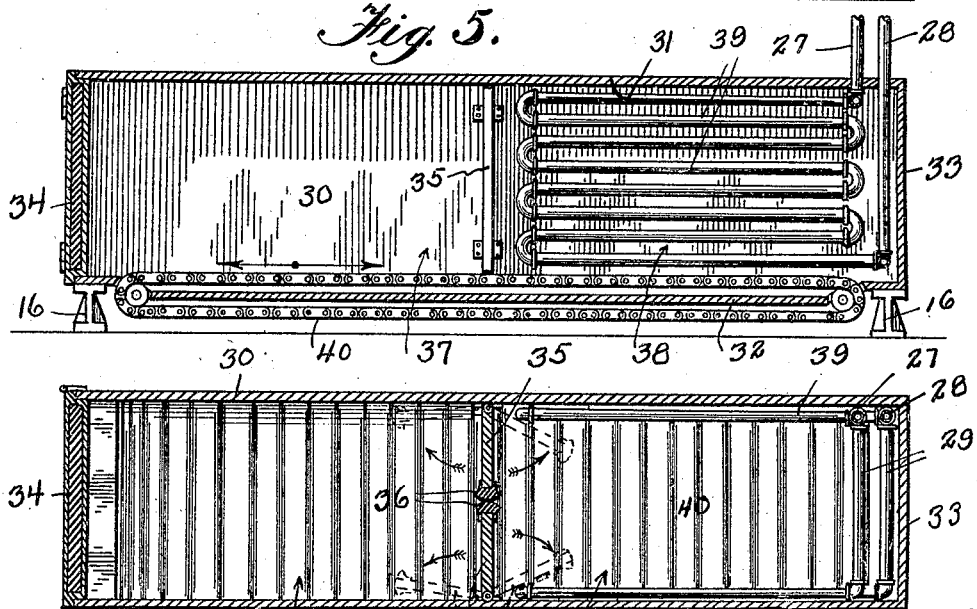
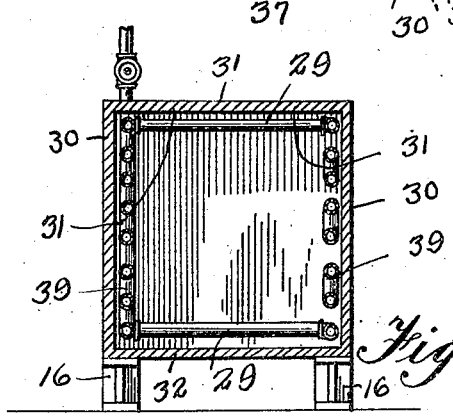

DAVID E. DUFRESNE, OF ST. LAMBERT, AND WILLIAM ADAMSON, OF MONTREAL, QUEBEC, CANADA.

STERILIZING APPARATUS.

1,419,031.   Specification of Letters Patent.   Patented June 6, 1922.

Application filed October 5, 1920. Serial No. 414,867.

*To all whom it may concern:*

Be it known that we, DAVID E. DUFRESNE and WILLIAM ADAMSON, both subjects of the King of Great Britain, residing at St. Lambert, and Montreal, Province of Quebec, Canada, respectively, have invented certain new and useful Improvements in Sterilizing Apparatus; and we do hereby declare that the following is a full, clear, and exact description of the invention, such as will enable others skilled in the art to which it appertains to make and use the same.

The present invention relates to new and useful improvements in a sterilizing apparatus, and more particularly one adapted to use in sterilizing the equipment of abattoirs, packing houses and the like.

The primary object of the invention is the provision of an apparatus for dry sterilizing abattoir and packing house equipment.

Another object of the invention is the provision of an apparatus such as above referred to, in which a suitable housing is provided with means for circulating the heating medium therethrough whereby the equipment of packing houses, abattoirs and the like, which may be placed therein, will be dry sterilized.

Another object of the invention is the provision of an apparatus such as above referred to in which any suitable heating means such as hot air, steam, electricity or the like may be used for dry sterilizing the equipment placed therein.

A still further object of the invention is the provision of a sterilizing apparatus such as above noted, which will be comparatively simple and inexpensive to manufacture, reliable and efficient in use, and readily operated.

With the above and other objects in view, the present invention resides in the novel features of construction, formations, combinations and arrangements of parts to be hereinafter more particularly described, claimed and illustrated in the accompanying drawings forming a part of the present application, and in which:

Figure 1 is a perspective view of one form of the invention in which the side walls have compartments through which the heating means circulates;

Figure 2 is a longitudinal sectional view thereof;

Figure 3 is a transverse sectional view thereof;

Figure 4 is a longitudinal sectional view through an apparatus in which a modified form of means is used, for circulating the heating medium therethrough and in which the spaced side walls are dispensed with and coils of pipe substituted therefor;

Figure 5 illustrates a still further modification in which two compartments are shown for preventing loss of heat;

Figure 6 is a horizontal sectional view therethrough; and, Figure 7 is a transverse sectional view taken through the apparatus disclosed in Figure 4.

Referring now to the accompanying drawings by corresponding characters of reference throughout the several views, the numeral 8 denotes in general our improved apparatus which may be of any shape and size, but, as shown in the accompanying drawings for the purposes of illustration, as being of a rectangular shape consisting of spaced outer and inner side walls 9 and 10 and spaced upper walls 11 and 12 and bottoms 13 and 14 forming a surrounding compartment 15 through which the heat circulates.

The apparatus 8 is mounted upon suitable legs 16 positioned preferably at the corners therewith and designed to hold the same above the ground so that the said apparatus will more efficiently retain its heat.

When trucks are to be sterilized, an inclined platform 17 may be positioned at the forward upper end 18 thereof, which is preferably closed by means of the hinged door 19 which may be of any suitable or well known construction designed to retain the heat within the apparatus.

Staggered horizontal partitions 20 are arranged between the side walls 9 and 10 to cause the heat to flow in the direction of the arrows shown in Figure 2 to efficiently heat the said inner walls 10 and the interior chamber 21 of the apparatus.

An inlet pipe 22 is connected with the upper side of the apparatus while an outlet pipe 23 leads from the bottom thereof.

In this form of device any suitable heating medium such as hot water, steam, hot air or the like may pass in through the pipe 22, flow through the surrounding compartment 15 between the walls thereof, and pass out through the pipe 23. If desired, a suitable gauge 24 may be connected to the pipe 22, while suitable control valves 25 may be employed to regulate the flow of the heating medium through the apparatus.

In this form of the invention, it is obvious that the equipment placed within the chamber 21 will be thoroughly dry sterilized by the heat therein.

Referring particularly to Figure 4 of the drawings which illustrates a modified form of the invention, the spaced side walls 9 and 10 are dispensed with and only the outer walls 10 are used. The walls 12 and 13 are likewise dispensed with and coils of pipe shown at 26 are placed adjacent to and parallel with the inner sides of the side walls. These coils are supplied by the inlet and outlet pipes 27 and 28 which may be connected upon opposite sides of the apparatus at the upper and lower ends thereof by the transverse pipes 29 so that a complete circulation of the heating medium is provided for.

In other respects this form of the invention corresponds in detail to that disclosed in Figures 1, 2 and 3.

Referring now particularly to Figures 5 and 6 of the invention, the numerals 30 denote the side walls which are connected at their upper and lower edges by a top 31 and a bottom 32 and at their rear ends by the end wall 33. A suitable door 34 corresponding to the before mentioned door 19 is employed to close the forward end of the apparatus.

In this structure, the device is substantially twice as long as that disclosed in the other two forms of the invention and is supported intermediate its ends by the hinged swinging doors 35 which are provided at their meeting edges with suitable rubber buffers 36 which when the doors are closed contact and seal the front and rear chambers 37 and 38.

Any suitable heating medium may be employed to heat the compartment or chamber 38. As illustrated, coils 39 similar to the before described coils 26 are preferably used, but the circulating means shown in Figure 2, namely the staggered partitions 20, may be employed instead of coils, within the scope of the invention.

A conveyer 40 extends through the compartments 37 and 38, preferably from the forward end of the device to the rear end thereof. One lap of the conveyer is disposed above the floor of the compartments while the other lap extends beneath the same. This conveyer is substantially the width of the apparatus and obviously may be moved in either direction, as indicated by the arrows as shown in Figure 5. In use, the truck or other equipment to be sterilized is placed in the compartment 37 upon the conveyer, the upper lap of which is then moved rearwardly, which causes the equipment to strike against the swinging doors 35 forcing them inwardly until the equipment is in the compartment 38, after which the doors 35 swing to, to the full line positions shown in Figure 6. By this arrangement, the opening or closing of the compartment in which the heating apparatus is placed does not cause the loss of any heat therein, and the equipment can be sterilized much quicker than if the said compartment was open to the atmosphere.

As before described, any suitable heating medium may be employed, and while the illustrations all show the device constructed for either steam, hot water or hot air, it is to be assumed that if desired electro heaters are to be employed if such an arrangement is preferred.

From the foregoing description taken in connection with the accompanying drawings, it will be manifest that a dry sterilizer for packing house or abattoir equipment is provided which will fulfil all of the necessary requirements of the device, and it should be understood in this connection that various minor changes in the specific details of construction can be resorted to within the scope of the appended claims, without departing from the spirit or sacrificing any of the advantages of the invention.

Having thus fully described our invention, what we claim as new and desire to protect by Letters Patent is:—

1. In an apparatus of the character described, the combination of a housing including opposite side walls, a top, a bottom and an end wall, a hinged closure for the opposite end of the housing and sealing the latter, a conveyer leading through the apparatus and extending through both compartments, closures hinged to the opposite side walls of the housing intermediate the ends thereof, buffers attached to the inner edges of the hinged closures for sealing the same, and means within the inner compartment for heating the same and dry sterilizing the equipment placed therein.

2. In an apparatus of the character described, the combination of a housing, hinged closures secured to the side walls of the housing intermediate the ends thereof and dividing the latter into two compartments, a conveyer extending through said housing and through both compartments thereof, whereby equipment placed in the outer compartment may be carried to the inner compartment and by its passage through the housing open the doors separating the compartments, and heating means for the inner compartment whereby equipment positioned therein will be sterilized.

In witness whereof we have hereunto set our hands.

DAVID E. DUFRESNE.
WILLIAM ADAMSON.